United States Patent
Dykins et al.

(10) Patent No.: US 7,096,468 B1
(45) Date of Patent: Aug. 22, 2006

(54) PROGRAMMER/FEEDER SYSTEM TASK LINKING PROGRAM

(75) Inventors: Fred Albert Dykins, Everett, WA (US); Lev M. Bolotin, Kirkland, WA (US); Vincent Warhol, Woodinville, WA (US)

(73) Assignee: Data I/O Corporation, Redmond, WA (US)

( * ) Notice: Subject to any disclaimer, the term of this patent is extended or adjusted under 35 U.S.C. 154(b) by 0 days.

(21) Appl. No.: 09/484,865

(22) Filed: Jan. 18, 2000

(51) Int. Cl.
*G06F 9/46* (2006.01)

(52) U.S. Cl. ............................ 718/100; 700/95; 700/96; 700/102

(58) Field of Classification Search ................ 198/346; 707/10; 345/705; 700/56, 108, 112, 95–96, 700/102; 709/100–108, 200–253; 718/100–108
See application file for complete search history.

(56) References Cited

U.S. PATENT DOCUMENTS

| | | | | |
|---|---|---|---|---|
| 4,544,318 A | * | 10/1985 | Nagatomo et al. | 198/346 |
| 4,821,197 A | * | 4/1989 | Kenik et al. | 700/106 |
| 5,162,986 A | | 11/1992 | Graber et al. | 364/146 |
| 5,224,055 A | * | 6/1993 | Grundy et al. | 716/11 |
| 5,262,954 A | * | 11/1993 | Fujino et al. | 700/112 |
| 5,644,487 A | | 7/1997 | Duff et al. | 364/140 |
| 5,814,375 A | * | 9/1998 | Hissen | 427/421 |
| 5,819,031 A | * | 10/1998 | Iwamoto | 709/230 |
| 5,896,292 A | * | 4/1999 | Hosaka et al. | 700/108 |
| 6,167,401 A | * | 12/2000 | Csipkes et al. | 707/10 |
| 6,182,225 B1 | * | 1/2001 | Hagiuda et al. | 713/201 |
| 6,272,618 B1 | * | 8/2001 | Tyner et al. | 712/31 |
| 6,289,462 B1 | * | 9/2001 | McNabb et al. | 726/21 |
| 6,360,291 B1 | * | 3/2002 | Tavallaei | 710/306 |
| 6,546,437 B1 | * | 4/2003 | Grimsrud | 710/8 |
| 6,658,268 B1 | * | 12/2003 | Bodnar et al. | 455/556.2 |
| 6,738,815 B1 | * | 5/2004 | Willis et al. | 709/225 |
| 2002/0120921 A1 | * | 8/2002 | Coburn et al. | 717/140 |

FOREIGN PATENT DOCUMENTS

| | | |
|---|---|---|
| EP | 0 376 738 A2 | 12/1989 |
| EP | 0 766 156 A1 | 9/1996 |
| FR | 2 727 219 A1 | 11/1994 |
| JP | 59-201152 A | 11/1984 |
| JP | 60-017553 A | 1/1985 |
| JP | 6-96594 A | 4/1994 |
| JP | 7-248913 A | 9/1995 |
| JP | 7-295795 A | 11/1995 |
| JP | 8-95617 A | 4/1996 |
| JP | 9-282897 A | 10/1997 |

OTHER PUBLICATIONS

Data I/O "TASKLINK for Windows" Information Sheet, Data I/O Corporation, 1999, 1 page.
BP-6500 In-Line Programming System brochure, BP Microsystems, Inc. 1999, 2 pages.
BP-6500 In-Line Programming System Data Sheet, BP Microsystems, Inc. 1999, 1 page.
"BP-6500 In-Line Programming & Fifth Generation Technology", BP Microsystems, Inc. 1999, 7 pages.

* cited by examiner

*Primary Examiner*—Meng-Ai T. An
*Assistant Examiner*—Kenneth Tang
(74) *Attorney, Agent, or Firm*—Mikio Ishimaru

(57) ABSTRACT

A task linking program is provided for using a computer for interacting with on-line and off-line programming systems to perform tasks related to programming microdevices. The program is secure in being capable of being setup only in an administrator mode where microdevice, programming system, and other information can be inputted and changed. The program has an operator mode in which the program can only run the programming system. This provides the ability to employ relatively low skill operators to use the programming system.

35 Claims, 7 Drawing Sheets

PROGRAMMER/FEEDER SYSTEM TASK LINKING PROGRAM

CROSS REFERENCE TO RELATED APPLICATION(S)

The present application contains subject matter related to U.S. patent application Ser. No. 09/418,732, now U.S. Pat. No. 6,532,395 B1 by Lev M. Bolotin entitled "MANUFACTURING SYSTEM WITH FEEDER/PROGRAMMING/ BUFFER SYSTEM". The related application is assigned to Data I/O Corporation and is hereby incorporated by reference.

The present application contains subject matter related to U.S. patent application Ser. No. 09/419,172, now U.S. Pat. No. 6,449,523 B1, by Bradley Morris Johnson, Lev M. Bolotin, Simon B. Johnson, Carl W. Olson, Bryan D. Powell, and Janine Whan-Tong entitled "FEEDER/PROGRAMMING/BUFFER OPERATING SYSTEM". The related application is assigned to Data I/O Corporation and is hereby incorporated by reference.

The present application also contains subject matter related to U.S. patent application Ser. No. 09/148,901, now U.S. Pat. No. 6,647,303 B1, by Simon B. Johnson, George Leland Anderson, Lev M. Bolotin, Bradley Morris Johnson, Mark Sean Knowles, Carl W. Olson, and Vincent Warhol entitled "FEEDER/PROGRAMMING/BUFFER CONTROL SYSTEM AND CONTROL METHOD". The related application is assigned to Data I/O Corporation and is hereby incorporated by reference.

TECHNICAL FIELD

The present invention relates generally to programming microdevices and more particularly to remote task programming for programmer/feeder systems.

BACKGROUND ART

Originally, standalone desktop programmers were developed that took data from an operator, typically an engineer, and programmed it directly into a programmable electronic microdevice. The mechanism for inserting and removing the microdevice from the desktop programmer was an operator who manually performed the task. The desktop programmer could only put data into and take data out of a microdevice, and manipulate the data.

At the same time, there were companies that produced electronic microdevice labelers. These labelers contained a built-in printer and would take labeling information, print a label, and place the label on the microdevice. These systems were more automated. They could take an entire tube of microdevices and move the each microdevice though the system, labeling each microdevice and placing it back it an empty receiving tube. In this system, the operator only had to handle the tube of microdevices and not each microdevice itself. However this system could only label parts.

A business, which needed to program and label microdevices, bought two completely different systems from two different companies. Then, as two separate processes they would program all their microdevices and then label all their microdevices.

Subsequently, a system was created which merged the two systems. The idea was to have an automated system that would program and label parts together in one process. Not only did this reduce the number of steps in the user's process, but it also eliminated the need for the operator to physically touch the microdevice. Now the operator only needed to handle the tubes of microdevices, inserting and removing them from the machine. The machine now did all the microdevice-by-microdevice handling, programming and labeling.

One big problem, however, was the two systems had no idea how to talk to each other. They were not designed to work together or to know of the other's existence. One good point was each of the different systems had a remote control interface. Hence, a handling link program was created that used each systems' remote control interface to arbitrate process control between the two systems.

With this arrangement, there existed a handling link program separate from a programmer program which was separate from a labeler program. They talked to each other, but generally were developed separately, updated separately, and in some cases developed by different companies.

During the development of the concept of a programmer/feeder system, it became apparent that a remote, non-connected control system and program was desirable. Unfortunately, for many years the "legacy" systems, or traditional systems, such as standalone programmers, had only focused on microdevice programming, data manipulation, and self-test capabilities. This meant that many new operations would have to be performed in a new program which can control both a programmer in an integrated system and a standalone programmer, where an operator has to manually insert the microdevices.

The new program would have to use each systems' remote control interface to arbitrate process control between the systems. It would have to provide a complete user interface for entering and storing all microdevice handling, labeling, and programming information. When an operator selects the setup information it must be sent to each component in the system. The new program would then have to start arbitration while keeping each of the components working in synchronization during the process. It would have to keep track of statistic results for the operations being performed. Ideally, the setup information would be stored to be easily used over and over again to run the same microdevices. Further, the new program would ideally also provide a mode of operation where an operator could manually, one by one, enter each of the parameters for programming a batch of microdevices and then just initiate operation.

In addition, it was apparent that many businesses wanted to have the capability of minimizing operator skill and dividing the operation of the new program into different parts than anything which had been done in the past. In essence, an engineering (free form) style user interface and a manufacturing (automated) style user interface were desired in one product.

Thus, it was apparent that there would be many major problems in developing a programmer/feeder system program which could be controlled from a separate personal computer while still being able to control previously developed legacy programming, labeling, and handling systems, and the systems which would evolve from them.

DISCLOSURE OF THE INVENTION

The present invention provides a task linking program for using a computer for interacting with on-line and off-line processing systems to perform tasks related to processing microdevices. The program is secure in being capable of being setup only in an administrator mode where microdevice, processing system, and other information can be inputted and changed. The program has an operator mode in which the program can only run the processing system. This provides the ability to employ relatively low skill operators to use the processing system.

The present invention provides a task linking program for using a computer for interacting with on-line and off-line programming systems to perform tasks related to programming microdevices. The program is secure in being capable of being setup only in an administrator mode where microdevice, programming system, and other information can be inputted and changed. The program has an operator mode in which the program can only run the programming system. This provides the ability to employ relatively low skill operators to use the programming system.

The present invention provides a task linking program for using a computer for interacting with a programming system to perform tasks related to programming microdevices. The program is capable of being used with both directly connected traditional programming systems and independent programming systems.

The above and additional advantages of the present invention will become apparent to those skilled in the art from a reading of the following detailed description when taken in conjunction with the accompanying drawings.

BEST MODE FOR CARRYING OUT THE INVENTION

The present invention relates to an overall system (not shown) which consists of three basic systems. First, is the computer system in which the program of the present invention operates. Second, is the legacy processing system, such as a programming system, which is on-line with the computer. And third, is the new processing system, such as a programmer/feeder system, which is generally off-line or generally operates independently from the computer system.

Figure 1:
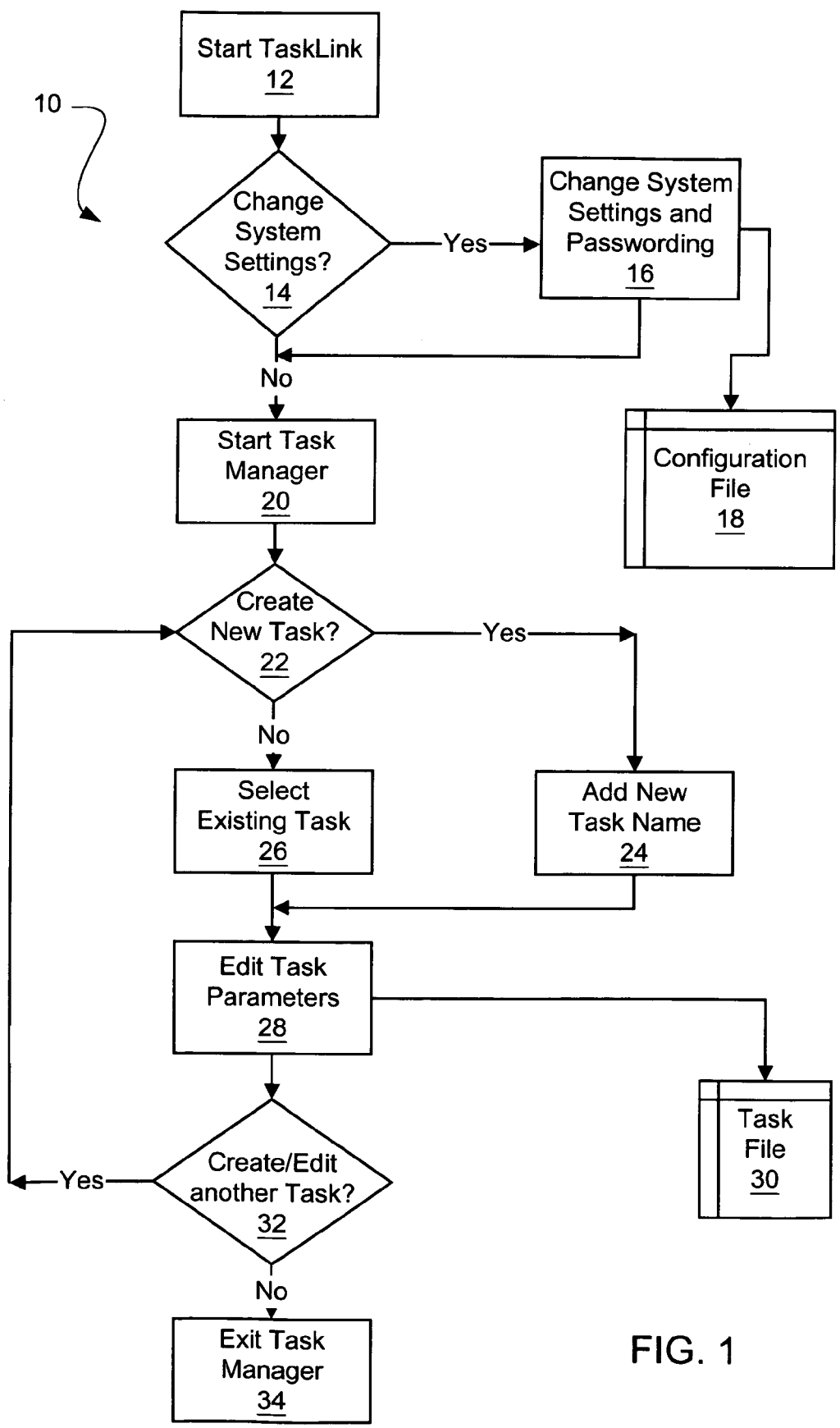
FIG. 1 is a flow chart of an administrator mode portion of the task linking program of the present invention.

Referring now to FIG. 1, therein is shown a portion of the task linking program of the present invention to be referred to as the TaskLink program for a wide variety of programming systems, some of them being off-line standalone programmers, some being desktop systems, and some being in-line systems, like a remote programmer/feeder system. In FIG. 1 is shown a flow chart of an administrator mode portion 10 of the TaskLink program where an administrator, such as a manufacturing engineer or supervisor, creates and set up all the settings and saves them.

The administrator starts the TaskLink program at a "Start TaskLink" block 12 with a display having a menu system and toolbars similar to Microsoft Word or Excel. This type of display is used throughout the TaskLink program because of its familiarity to users. The program then proceeds to "Change Systems Settings?" block 14 for the administrator to verify that the correct settings are in place for the systems the TaskLink program is set up to control. Mostly the system preferences are settings that the administrator is expected to set when TaskLink is first installed, or expect to change very infrequently.

If there were a need to change the settings, there would be menus and dialog boxes in a "Change System Settings and Passwording" block 16 and basically the administrator would pick from the menu system on the screen to change the settings and indicate completion by clicking "OK".

During the initial startup, the TaskLink program may be used to setup a security passwording system. This will prompt for a password which will be preset to allow the program to operate subsequently in either an administrator mode or an operator mode. The administrator mode allows access to the entire program at an engineering level while the operator mode only permits processing microdevices with very limited preset selections. This provides a level of security which prevents unauthorized operators from making any changes in the program.

The new system settings would then get saved in a "Configuration File" block 18.

If there were no need to change the settings, the program would proceed to a "Start Task Manager" block 20. A "task" is defined as all the information necessary to process a component, such as a programmable electronic microdevice (programmable electronic microdevices include, but are not limited to, electronically erasable read only memory (EEPROM), microcontrollers, and microprocessors), and a "kit" is defined as a series of tasks for example to process all the microdevices for a single printed circuit board.

From the "Start Task Manager" block 20, the program proceeds to the "Create New Task?" block 22 from where the administrator would be able to add a new one task with a new name at "Add New Task Name" block 24 or just highlight an existing task at "Select Existing Task" block 26. Both blocks proceed to an "Edit Task Parameters" block 28 where a task is created or edited. This is where settings are input or edited by a conventional editor, such as the name of the microdevice, the programming parameters, the data file parameters, etc. The editor is capable of performing conventional editing functions as well as functions such as importing and exporting information from task databases and ASCII task files.

After the task parameters have been edited in the "Edit Task Parameters" block 28, the program proceeds to a "Create/Edit Another Task" block 32 to see if any other edits should be made. If there are further changes desired, the program returns to a "Create New Task" block 22. If there are not, the program goes to the "Exit Task Manager" block 34.

Figure 2:
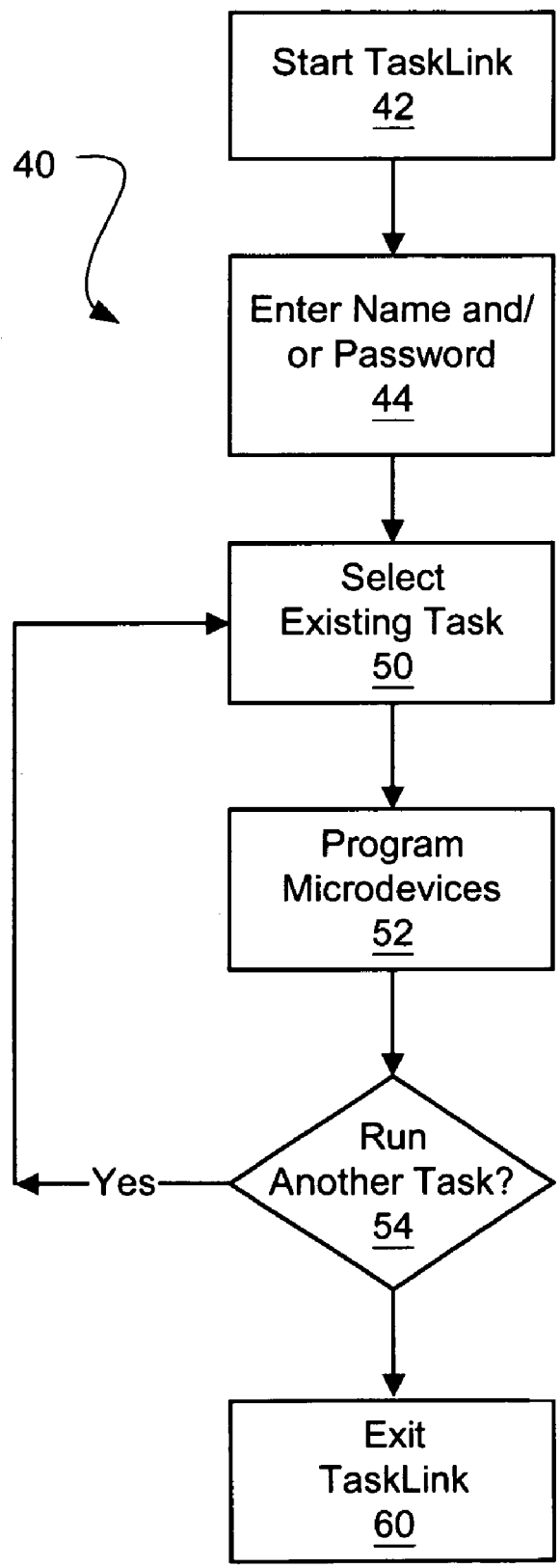
FIG. 2 is a flow chart of an operator mode portion of the task linking program of the present invention.

Referring now to FIG. 2, therein is shown a flow chart of an operator mode portion 40 of the TaskLink program where an operator merely uses the program. The administrator mode portion in FIG. 1 describes the preparation process for programming microdevices which would generally not be run by an operator. The operator mode portion 40 is set up for a low-skill operator although an administrator may run this portion of the TaskLink program for quality assurance purposes.

As a result, after entry of the name and/or password in the "Enter Name and/or Password" block 44, an authorized operator will proceed to a "Select Existing Task" block 50.

The "Select Existing Task" block 50 would have a list indicating the tasks, which the operator is allowed to perform, and permits the operator to only select those tasks and set them to "run".

The TaskLink program then proceeds to a "Program Microdevices" block 52. This block will be described in greater detail with reference to FIGS. 3A–3C for on-line systems and FIGS. 4A–4B for off-line systems.

From the "Program Microdevices" block 52, the program proceeds to the "Run Another Task" block 54. Basically, the operator only has two choices. Either another task can be run or the TaskLink program is exited.

Figure 3A:
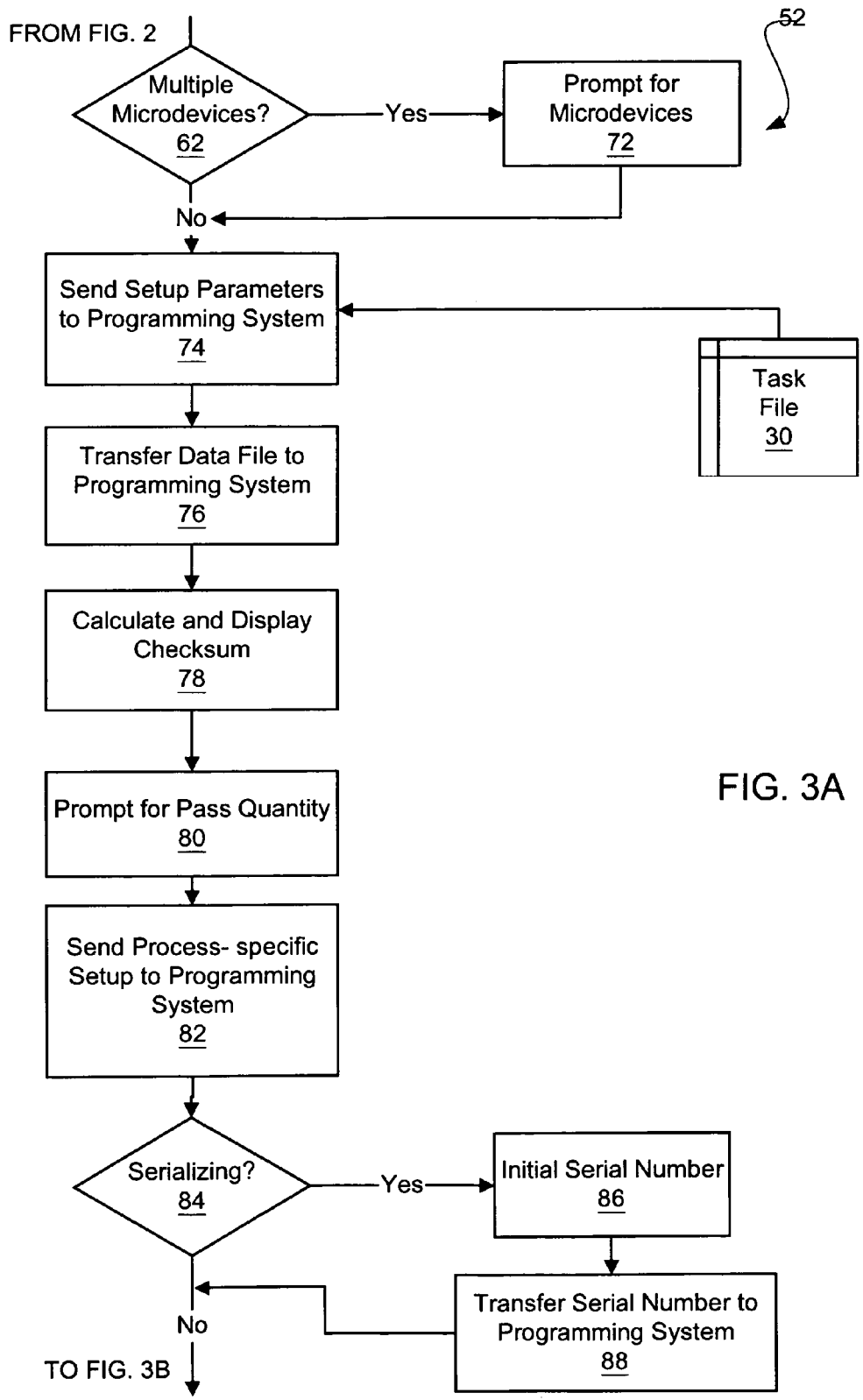
FIGS. 3A–3C is a flow chart of the programming of the present invention for legacy and related systems.
Figure 3B:
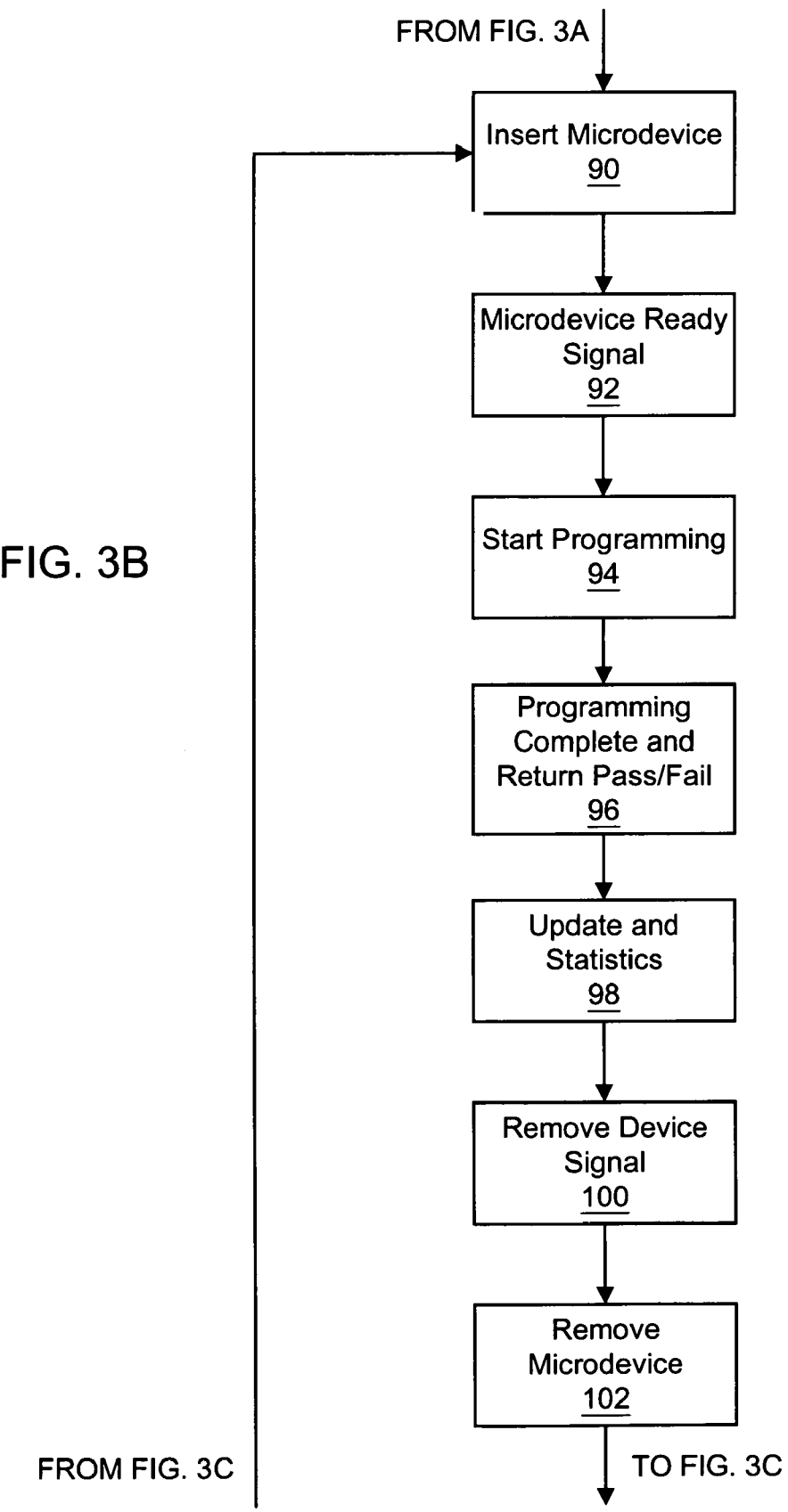
Figure 3C:
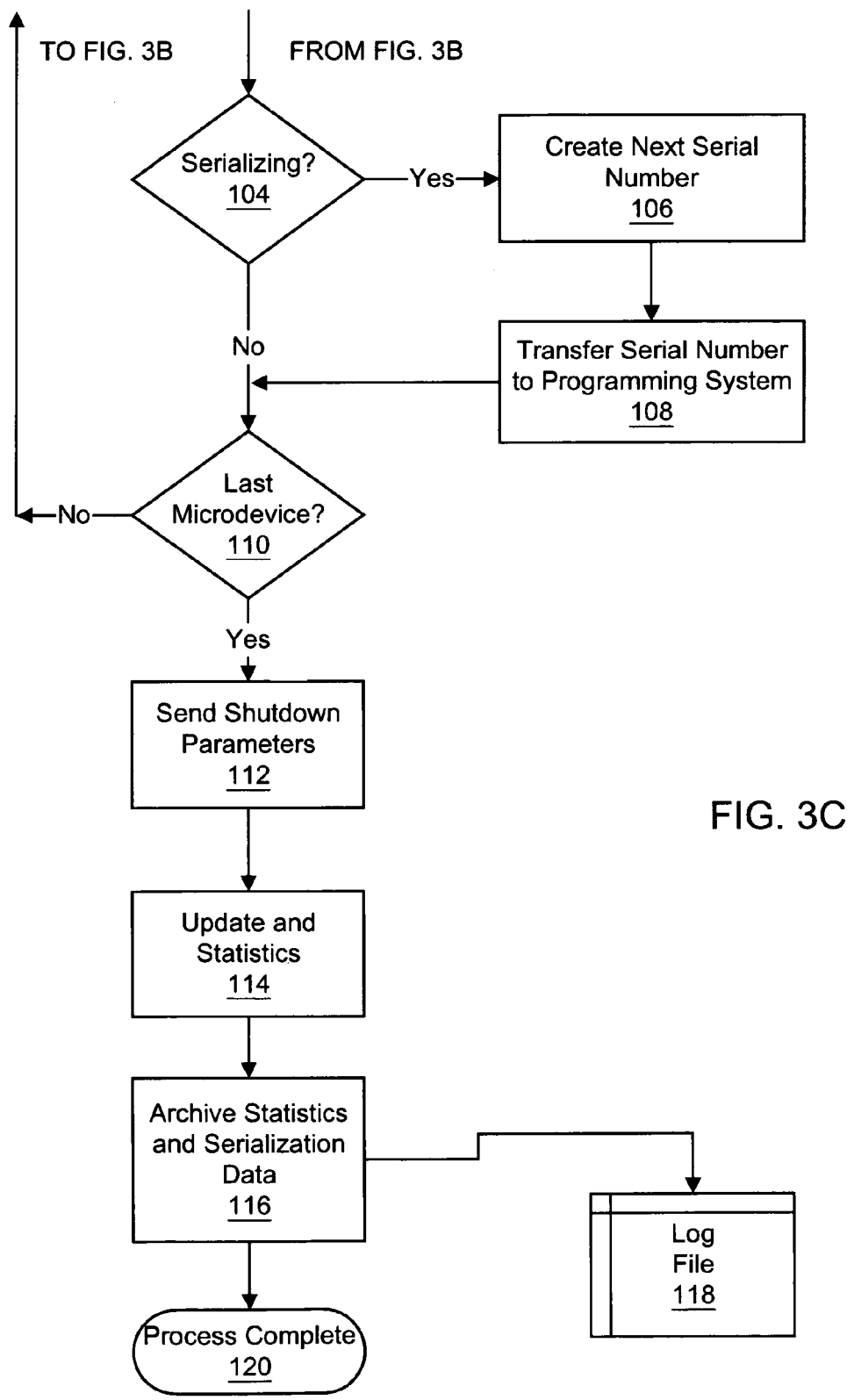

Referring now to FIGS. 3A–3C, therein is shown the legacy and related system processing in the "Program Microdevices" block 52 in FIG. 2. Generally in these systems, the computer on which the TaskLink program resides is directly connected to the programming system by a local area network, such as Ethernet.

Starting with FIG. 3A, after the "Select Existing Task" block 50 by the operator, the TaskLink program checks in a "Multiple Microdevices?" block 62 to see if the names of multiple microdevices, multiple processes, multiple configurations within one task, and/or multiple settings are within the existing task.

If the task contains multiple microdevices, processes, etc., the program goes to a "Prompt for Microdevices" block 72 where the operator enters the desired microdevices, processes, etc. to be run. This feature may be used, for example, where a business may be using two different microdevices with one from a second source supplier. The purchasing department may be changing microdevice suppliers on a weekly basis. Since it would be complex for the programming system to determine which microdevice is currently being processed, it is easier preprogram the TaskLink program with the information for the different microdevices and to have the operator identify the particular microdevice to be processed.

If the task does not contain multiple microdevices and/or processes, the program proceeds to a "Send Setup Parameters to Programming System" block 74. The setup parameters are obtained by the "Send Setup Parameters to Programming System" block 74 from the "Task File" block 30 shown in FIG. 1.

After the "Send Setup Parameters to Programming System" block 74, the program proceeds to a "Transfer Data File to Programming System" block 76 where the data files relating to the microdevices are transferred to the programming system. For example, for a programmable microdevice, the microdevice programming would be transferred at this point. The integrity of the data is then checked in a "Calculate and Display Checksum" block 78.

Next, the operator is prompted for the number of good microdevices desired out of the production run in a "Prompt for Pass Quantity" block 80. This will let the processing run until the desired number or quantity of good or passable microdevices are programmed. Then, the program goes to a "Send Process-specific Setup to Programming System" block 82 to send out the appropriate setup information.

Since it is getting more common to provide serial numbers for processed microdevices, a "Serializing?" block 84 asks this question. If yes, a serial number is provided at an "Initial Serial Number" block 86. The serial number is then transferred to the programming system by a "Transfer Serial Number to Programming System" block 88.

The program then returns to proceed in FIG. 3B.

In FIG. 3B, there are the visual directions, which are given to an operator if manual feed of the microdevices is involved, or the programming where automated handling equipment is involved. In an "Insert Microdevice" block 90, the operator or handling equipment is instructed to insert the microdevice into the programming equipment, such as a programmer.

Programming starts when the TaskLink program receives a signal in the "Microdevice Ready Signal" block 92. The TaskLink program then starts the programming in "Start Programming" block 94. When the microdevice is completely processed, a return signal is received by the TaskLink program indicating that the programming is complete and providing statistical information in a "Programming Complete and Return Pass/Fail" block 96.

Upon completion of programming of the single microdevice, the TaskLink program updates the displays and statistics in the "Update" block 98 and provides an instruction in a "Remove Microdevice Signal" block 100. The operator or handling equipment then follows the instruction in a "Remove Microdevice" block 102. The TaskLink program then proceeds to FIG. 3C.

In FIG. 3C, the TaskLink program prepares for the next microdevice by again asking about serialization in a "Serializing?" block 104. If yes, a serial number is provided at a "Create Next Serial Number" block 106. The serial number is then transferred to the programming system by a "Transfer Serial Number to Programming System" block 108. A check is then made to determine if the appropriate number of good microdevices have been processed in a "Last Microdevice?" block 110. If no, the program returns to the "Insert Microdevice" block 90 where the operator or handling equipment is instructed to insert the next microdevice into the programming system. If yes, the TaskLink program starts shutdown in a "Send Any Necessary Shutdown Parameters" block 112.

The TaskLink program then goes to a "Final Display Update and Statistics" block 114 where final information is displayed and then archived in an "Archive Statistics and Serialization Data" block 116. This final information is then stored in a "Log File" block 118 and the TaskLink program finishes at a "Process Complete" block 120.

In the above, the computer and the TestLink program are in constant interaction and contact and the contact may be described as being one of an "on-line" connection between the computer system and the programming system.

Figure 4A:
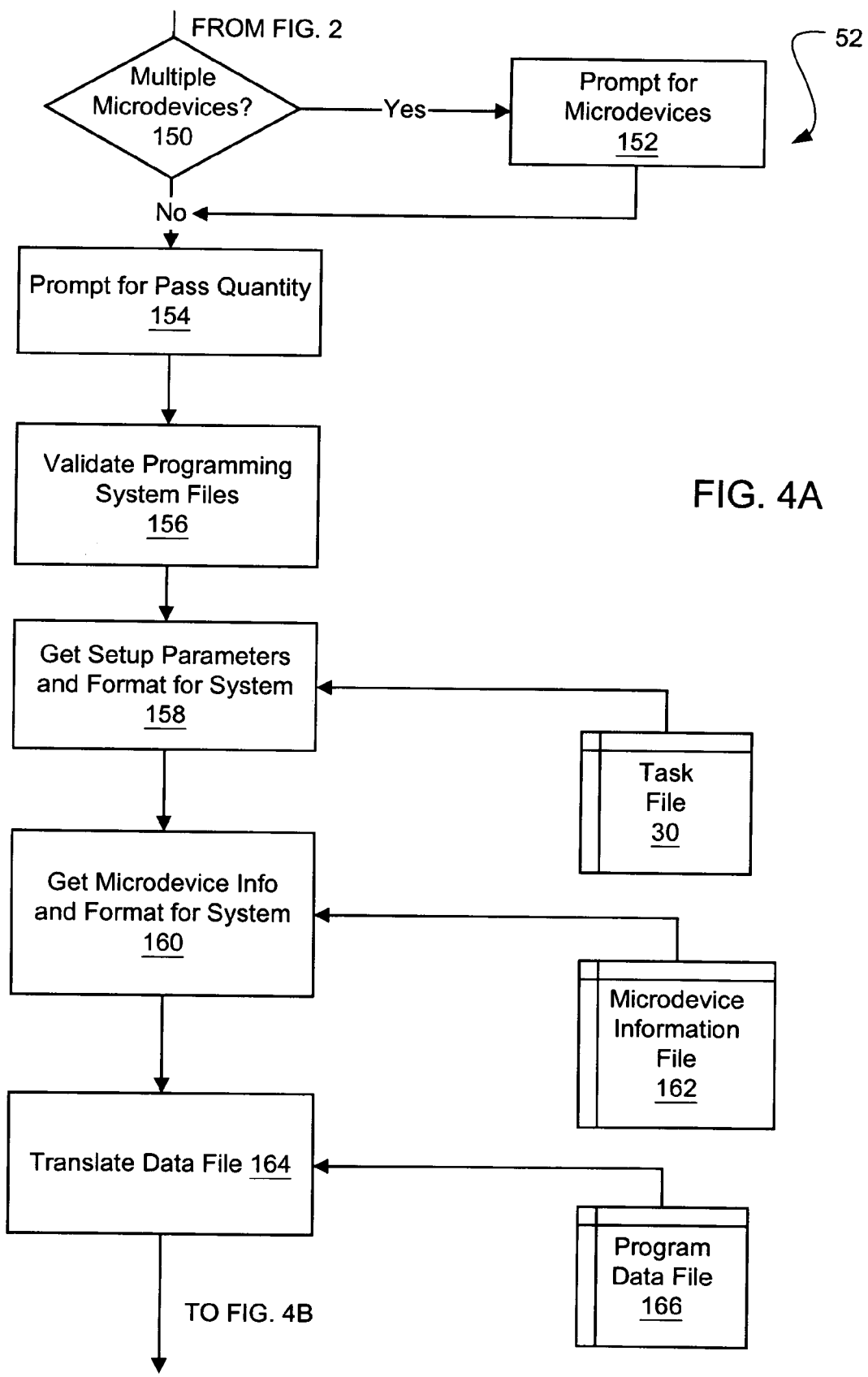
FIGS. 4A–4B, is a flow chart of the programming of the present invention for a programmer/feeder system.
Figure 4B:
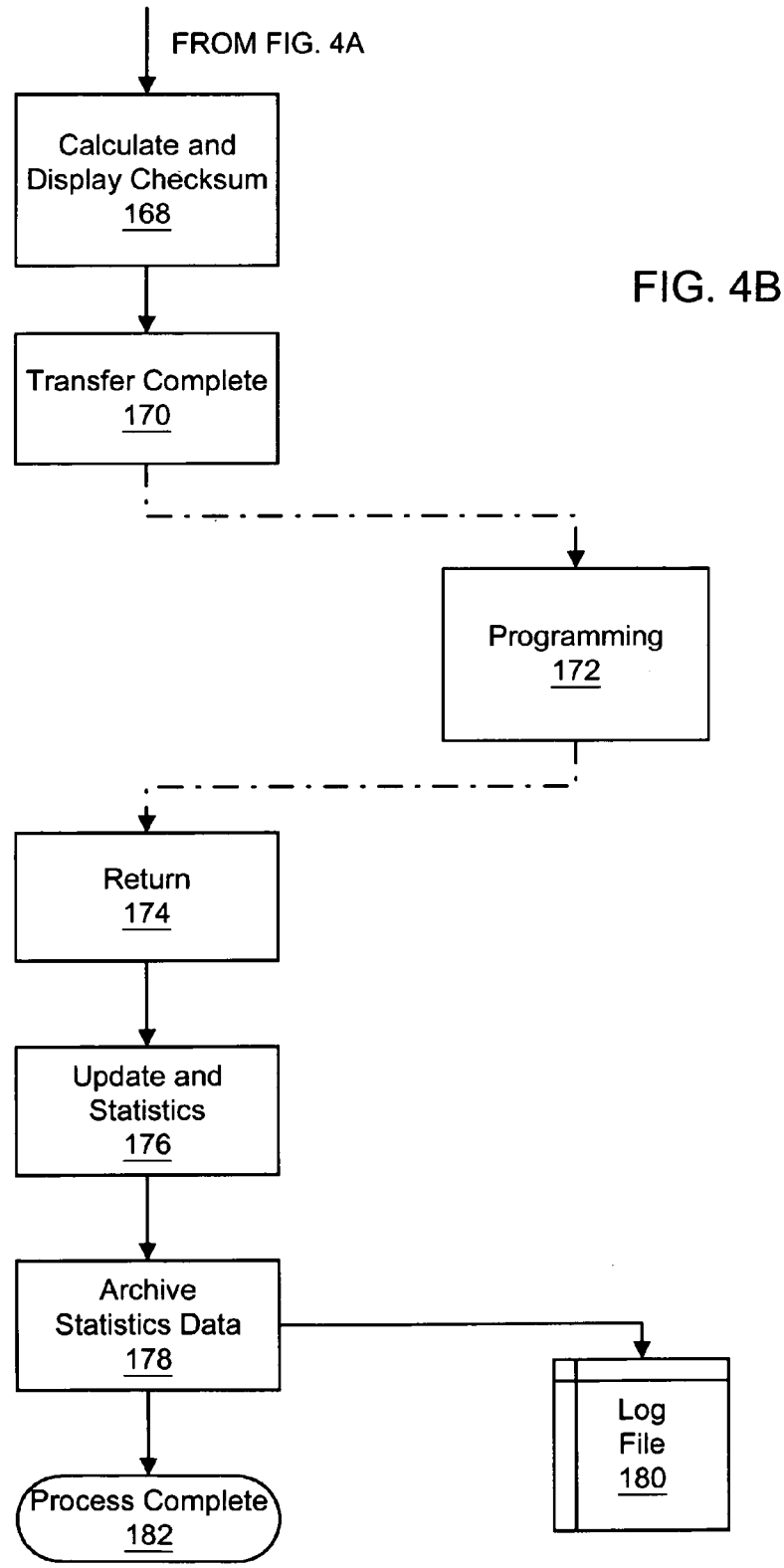

Referring now to FIGS. 4A–4B, therein is shown the programming for a programming system, such as a programmer/feeder system, in the "Process Microdevices" block 52 in FIG. 2. Generally in these systems, the computer system on which the TaskLink program resides is not directly connected to control the programmer/feeder system and is connected to provide and receive information periodically to and from the programmer/feeder system. However, it would be evident to those skilled in the art that nothing herein precludes a direct connection between the computer and the programmer/feeder system by a local area network, but the operation would be one in which there would not constant interaction and contact. This type of contact where the computer is isolated from the programming system while the processing occurs is referred to as an "off-line" connection.

Starting with FIG. 4A, after the "Select Existing Task" block 50 in FIG. 2 by the operator, the TaskLink program checks in a "Multiple Microdevices?" block 150 to see if the names of multiple microdevices, multiple processes, multiple configurations, and/or multiple settings are within the existing task.

If the task contains multiple microdevices, processes, etc., the program goes to a "Prompt for Microdevices" block 152 where the operator enters the desired microdevices, processes, etc. for programming.

Next, the operator is prompted for the number of good microdevices desired out of the production run in a "Prompt for Pass Quantity" block 154.

Since the computer system is off-line while the programmer/feeder system is processing in the preferred embodiment, the next step in "Validate Programming System Files"

block 156 uses a portable memory medium in the communication process. The different types of portable memory media include, but are not limited to, non-volatile electronic memory cards (such as PCMCIA memory cards), magnetic memory (such as mini-disk drives), and optical memory (such as compact disk). In the preferred mode, a portable magnetic memory card is used.

The computer inserts information on to the portable memory card such as that the proper programmer/feeder system is in place and to validate that all the proper components for programming are in place on the programmer/feeder system.

If the computer system were connected to the programmer/feeder system by a local area network, the above operation would be performed directly rather than by using a portable memory medium.

After validation, the TaskLink program will obtain information for the memory card in a "Get Setup Parameters and Format for System" block 158. The information is obtained from the "Task File" block 30 in FIG. 1 and then formatted into a file that the programmer/feeder system expects to read. The information includes the microdevice being processed and its operational and programming characteristics. The format information is obtained from a Microsoft database file in "Microdevice Information File" block 162.

In a "Translate Data File" block 164, the programming data for the microdevice from the "Program Data File" block 166 is decoded into binary data.

In FIG. 4B, the binary data is checked in a "Calculate and Display Checksum" block 168 by checking sum and error correction bits.

The transfer of information for a complete job occurs at a "Transfer Complete" block 170, where the information is loaded into the memory card.

The next step is performed off-line from the computer and independent of the TaskLink program. This is indicated by a "Programming" block 172. This would be the programming or other processing information of the various microdevices. The off-line connection is denoted by a dot-dash line.

Upon completion of programming in the "Programming" block 172, the job statistics are returned at "Return" block 174 by the memory card. The off-line connection is again denoted by a dot-dash line. The TaskLink program then goes to a "Final Display Update and Statistics" block 176 where final information is received and then archived in an "Archive Statistics" block 178. This final information is then stored in a "Log File" 180 and the TaskLink program finishes at a "Process Complete" block 182.

In summary, the operator in step one starts the TaskLink program on the computer and the program bundles up all the information, gathers all the settings, etc., and writes a group of files out onto a memory card. In step two, the operator takes that memory card over to the programmer/feeder system, plugs it in and then initiates the actual, the real operation to run the programmer/feeder system. When the programmer/feeder system is finished it puts a statistics file back on the memory card. Then, in step three, the operator takes the memory card out of the programmer/feeder system and puts it in the computer so that the TaskLink program can archive the results and show the statistics in the future.

From the above it will be understood that the present invention is applicable to what can be described as "microdevices". Microdevices include a broad range of electronic and mechanical devices. The best mode describes processing which is programming for programmable devices, which include but are not limited to devices such as Flash memories (Flash), electrically erasable programmable read only memories ($E^2PROM$), programmable logic devices (PLDs), field programmable gate arrays (FPGAs), and microcontrollers. However, the present invention encompasses processing for all electronic, mechanical, hybrid, and other devices which require testing, measurement of device characteristics, calibration, and other processing operations. For example, these types of microdevices would include but not be limited to devices such as microprocessors, integrated circuits (ICs), application specific integrated circuits (ASICs), micro mechanical machines, micro-electro-mechanical (MEMs) devices, micro modules, and fluidic systems.

It will also be understood that the programmer/feeder system includes its own microprocessor for controlling its own operations. Thus, the portable media could also be used to update the software and the firmware in the programmer/feeder system.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

What is claimed is:

1. A method for processing microdevices comprising:
    providing a computer system having processing information related to microdevices as a task;
    providing a legacy processing system;
    providing a non-legacy processing system for operating independently from the computer system;
    providing the task from the computer system to the legacy processing system with constant interaction therebetween;
    providing the task from the computer system to the non-legacy processing system for performing the task by the non-legacy processing system independent of the computer system;
    developing return non-legacy information resulting from the non-legacy processing system using the task;
    returning the return non-legacy information to the computer system;
    providing the processing system setup parameters to the legacy processing system and the non-legacy processing system;
    providing the processing system shutdown parameters to the non-legacy processing system simultaneously with the processing system setup parameters;
    providing the number of processed microdevices to be output from the legacy processing system and the non-legacy processing system;
    providing processing system process-specific parameters to the legacy processing system and the non-legacy processing system;
    controlling the handling of the microdevices;
    processing the microdevices;
    providing the processing system shutdown parameters to the legacy processing system;
    providing a number of microdevices;
    determining the number of microdevices processed;
    determining the number of microdevices handled; and
    developing statistics from the number of microdevices processed and handled.

2. The method as claimed in claim 1 additionally comprising:
   providing a microdevice programming system in the legacy processing system, the legacy processing system having an on-line connection with said computer system; and
   programming the microdevices in the microdevice programming system using the task provided through the on-line connection from the computer system to the processing system.

3. The method as claimed in claim 1 additionally comprising:
   providing an operator mode;
   providing a microdevice programming system in the non-legacy processing system, the microdevice programming system standing alone from the computer system;
   using the processing information for the task in the operator mode in the non-legacy processing system independent from the computer system;
   returning return information in the operator mode from the non-legacy processing system using portable medium to the computer system; and
   storing the return information in the computer system.

4. The method as claimed in claim 1 additionally comprising:
   providing an administrator mode;
   providing programming information related to the task in the administrator mode;
   editing the processing and programming information related to the task in the administrator mode; and
   storing the processing and programming information related to the microdevices for the legacy processing system and the non-legacy processing system as the task in the administrator mode.

5. The method as claimed in claim 1 additionally comprising:
   serializing the microdevices; and
   maintaining a log of the serialized microdevices.

6. The method as claimed in claim 1 additionally comprising:
   combining a plurality of tasks to define a kit; and
   performing the processing of a kit in the legacy processing system and the non-legacy processing system.

7. The method as claimed in claim 1 additionally comprising:
   providing microdevice information;
   providing processing system setup parameters;
   providing format information related to the non-legacy processing system;
   inputting the number of processed microdevices to be output from the non-legacy processing system;
   providing the processing system setup parameters and format to the non-legacy processing system;
   transferring the microdevice information from the computer system to the non-legacy processing system;
   transferring the processing system format from the computer system to the non-legacy processing system;
   processing the microdevices;
   obtaining information from the processing of the microdevices; and
   transferring the information from the processing of the microdevices to the computer system.

8. The method as claimed in claim 7 wherein the step of: transferring includes the use of a portable memory medium.

9. The method as claimed in claim 7 wherein the step of: transferring includes the use of a direct communication connection.

10. The method as claimed in claim 1 including the steps of
    providing an administrator mode; and
    protecting provision of the operator mode using a password input in the administrator mode.

11. A method for processing and programming programmable microdevices comprising:
    providing a computer system having processing information and programming information related to programmable microdevices combined as a task in the computer system;
    providing a legacy processing system;
    providing a programmer/feeder system for operating independently from the computer system;
    providing the task from the computer system to the programmer/feeder system;
    performing the task by the programmer/feeder system independent of the computer system by processing and programming the programmable microdevices;
    developing return programmer/feeder information resulting from the programmer/feeder system using the processing information;
    returning the return programmer/feeder information to the computer system;
    providing the processing system setup parameters to the legacy processing system and the programmer/feeder system;
    providing the processing system shutdown parameters to the programmer/feeder system simultaneously with the processing system parameters,
    providing the number of processed programmable microdevices to be output from legacy processing system and the programmer/feeder system;
    providing the processing system process-specific parameters to legacy processing system and the programmer/feeder system;
    controlling the handling of the programmable microdevices;
    programming the programmable microdevices;
    providing the processing system shutdown parameters to the legacy processing system;
    providing a number of programmable microdevices;
    determining the number of programmable microdevices processed;
    determining the number of programmable microdevices handled; and
    developing statistics from the number of programmable microdevices processed and handled.

12. The method as claimed in claim 11 additionally comprising:
    providing a microdevice programming system in the programmer/feeder system, the programmer/feeder system having an on-line connection with said computer system; and
    performing the task by the programmer/feeder dependent on the computer system using programming information obtained through the on-line connection.

13. The method as claimed in claim 11 additionally comprising:
    providing an operator mode;
    using portable memory medium to provide the task in the operator mode to the programmer/feeder system independent from the computer system;

returning return programmer/feeder information in the operator mode using the portable memory medium to the computer system; and storing the return programmer/feeder information in the computer system.

14. The method as claimed in claim 11 comprising:

providing an administrator mode;

providing the processing and programming information related to the task in the administrator mode;

editing the processing and programming information related to the task in the administrator mode; and storing the processing and programming information related to the programmable microdevices for the legacy processing system and the programmer/feeder system in the administrator mode.

15. The method as claimed in claim 11 additionally comprising:

serializing the programmable microdevices; and maintaining a log of the serialized programmable microdevices.

16. The method as claimed in claim 11 additionally comprising:

combining a plurality of tasks to define a kit; and performing the programming of a kit in the legacy processing system and the programmer/feeder.

17. The method as claimed in claim 11 additionally comprising:

providing programmable microdevice information;

providing programmer/feeder system setup parameters;

providing format information related to the programmer/feeder system;

inputting the number of processed programmable microdevices to be output from the programmer/feeder system;

providing the programmer/feeder system setup parameters and format to the programmer/feeder system;

transferring the programmable microdevice information from the computer system to the processing system;

transferring the programmer/feeder system form from the computer system to the programmer/feeder system;

processing the programmable microdevices;

obtaining information from the processing of the programmable microdevices; and transferring the information from the programming of the programmable microdevices.

18. The method as claimed in claim 17 wherein the step of:

transferring includes the use of a portable memory medium.

19. The method as claimed in claim 18 wherein the step of:

transferring includes the use of a local area network connection.

20. The method as claimed in claim 11 including the steps of:

providing an administrator mode; and protecting provision of the operator mode using a password input in the administrator mode.

21. The method as claimed in claim 11 including the step of:

providing information for affecting changes selected from a group consisting of software, firmware, and a combination thereof by using a portable memory medium.

22. A method for processing microdevices comprising:

providing a computer system having processing information related to the microdevices as a task;

providing a legacy processing system;

providing a non-legacy processing system;

providing the task from the computer system to the legacy processing system with constant interaction therebetween;

providing the task from the computer system to the non-legacy processing system for performing the task by the non-legacy processing system independent of the computer system;

developing return non-legacy information resulting from the non-legacy processing system using the task;

returning the return non-legacy information to the computer system;

providing a microdevice programming system in the legacy processing system, the legacy processing system having an on-line connection with said computer system; and programming the microdevices in the microdevice programming system using the task provided through the on-line connection from the computer system to the processing system.

23. The method as claimed in claim 22 including additionally comprising:

providing the processing system setup parameters to the legacy processing system and the non-legacy processing system;

providing the processing system shutdown parameters to the non-legacy processing system simultaneously with the processing system setup parameters;

providing the number of processed microdevices to be output from the legacy processing system and the non-legacy processing system;

providing processing system process-specific parameters to the legacy processing system and the non-legacy processing system;

controlling the handling of the microdevices;

processing the microdevices; and providing the processing system shutdown parameters to the legacy processing system.

24. The method as claimed in claim 23 additionally comprising:

providing a number of microdevices;

determining the number of microdevices processed;

determining the number of microdevices handled; and developing statistics from the number of microdevices processed and handled.

25. The method as claimed in claim 23 additionally comprising:

serializing the microdevices; and maintaining a log of the serialized microdevices.

26. The method as claimed in claim 22 additionally comprising:

providing microdevice information;

providing processing system setup parameters;

providing format information related to the off-line connection;

inputting the number of processed microdevices to be output from the processing system;

providing the processing system setup parameters and format to the processing system;

transferring the microdevice information from the computer to the processing system;

transferring the processing system format from the computer to the processing system;

processing the microdevices;

obtaining information from the processing of the microdevices; and transferring the information from the processing of the microdevices.

27. The method as claimed in claim 26 wherein:
transferring includes the use of a portable memory medium.

28. The method as claimed in claim 26 wherein:
transferring includes the use of a direct communication connection.

29. A method for processing and programming programmable microdevices comprising:
providing a computer system having processing information and programming information related to the programmable microdevices combined as a task in the computer system;
providing a legacy processing system;
providing a programmer/feeder system;
providing the task from the computer system to the programmer/feeder system;
performing the task by the programmer/feeder system independent of the computer system by processing and programming the programmable microdevices;
developing return programmer/feeder information resulting from the programmer/feeder system using the processing information; and
returning the return programmer/feeder information to the computer system;
providing a microdevice programming system in the programmer/feeder system, the programmer/feeder system having an on-line connection with said computer system; and
performing the task by the programmer/feeder dependent on the computer system using programming information obtained through the on-line connection.

30. The method as claimed in claim 29 additionally comprising:
providing the processing system setup parameters to the legacy processing system and the programmer/feeder system;
providing the processing system shutdown parameters to the programmer/feeder system simultaneously with the processing system parameters;
providing the number of processed programmable microdevices to be output from legacy processing system and the programmer/feeder system;
providing the processing system process-specific parameters to legacy processing system and the programmer/feeder system;
controlling the handling of the programmable microdevices;
programming the programmable microdevices; and
providing the processing system shutdown parameters to the legacy processing system.

31. The method as claimed in claim 30 additionally comprising:
providing a number of programmable microdevices;
determining the number of programmable microdevices processed;
determining the number of programmable microdevices handled; and
developing statistics from the number of programmable microdevices processed and handled.

32. The method as claimed in claim 30 additionally comprising:
serializing the programmable microdevices; and
maintaining a log of the serialized programmable microdevices.

33. The method as claimed in claim 29 additionally comprising:
providing programmable microdevice information;
providing programmer/feeder system setup parameters;
providing format information related to the programmer/feeder system;
inputting the number of processed programmable microdevices to be output from the programmer/feeder system;
providing the programmer/feeder system setup parameters and format to the programmer/feeder system;
transferring the programmable microdevice information from the computer system to the processing system;
transferring the programmer/feeder system form from the computer system to the programmer/feeder system;
processing the programmable microdevices;
obtaining information from the processing of the programmable microdevices; and
transferring the information from the programming of the programmable microdevices.

34. The method as claimed in claim 33 wherein:
transferring includes the use of a portable memory medium.

35. The method as claimed in claim 34 wherein:
transferring includes the use of a local area network connection.

* * * * *

UNITED STATES PATENT AND TRADEMARK OFFICE
CERTIFICATE OF CORRECTION

PATENT NO. : 7,096,468 B1 Page 1 of 1
APPLICATION NO. : 09/484865
DATED : August 22, 2006
INVENTOR(S) : Dykins et al.

It is certified that error appears in the above-identified patent and that said Letters Patent is hereby corrected as shown below:

Column 1, line 23, delete "09/148,901" and insert therefor --09/418,901 --

Signed and Sealed this

Fourteenth Day of November, 2006

JON W. DUDAS
*Director of the United States Patent and Trademark Office*